Oct. 14, 1958     M. N. DOSTER     2,855,834
AUTOMATIC PHOTOGRAPHIC PRINTING MACHINE Filed Dec. 20, 1954     8 Sheets-Sheet 1

Moren Nubie Doster
INVENTOR.

Oct. 14, 1958 M. N. DOSTER 2,855,834
AUTOMATIC PHOTOGRAPHIC PRINTING MACHINE
Filed Dec. 20, 1954 8 Sheets-Sheet 2

Fig.2

Moren Nubie Doster
INVENTOR.

BY *Clarence A. O'Brien*
*and Harvey B. Jackson*
Attorneys

Oct. 14, 1958

M. N. DOSTER

2,855,834

AUTOMATIC PHOTOGRAPHIC PRINTING MACHINE

Filed Dec. 20, 1954

Moren Nubie Doster
INVENTOR.

BY
*Attorneys*

Oct. 14, 1958　　　　M. N. DOSTER　　　　2,855,834
AUTOMATIC PHOTOGRAPHIC PRINTING MACHINE
Filed Dec. 20, 1954　　　　　　　　　　　　　8 Sheets-Sheet 6

Moren Nubie Doster
INVENTOR.

BY *Clarence A. O'Brien*
*and Harvey B. Jackson*
Attorneys

Oct. 14, 1958  M. N. DOSTER  2,855,834
AUTOMATIC PHOTOGRAPHIC PRINTING MACHINE
Filed Dec. 20, 1954  8 Sheets-Sheet 7

Moren Nubie Doster
INVENTOR.

Fig. 14

Moren Nubie Doster
INVENTOR.

United States Patent Office 2,855,834
Patented Oct. 14, 1958

2,855,834

AUTOMATIC PHOTOGRAPHIC PRINTING MACHINE

Moren Nubie Doster, Fitzgerald, Ga.

Application December 20, 1954, Serial No. 476,124

22 Claims. (Cl. 95—75)

This invention relates to automatic photographic printing machines for making photographic prints from negatives.

For several purposes, for instance, for making photographs of groups of persons or for making portraits to be distributed among a group or for advertising and publicity purposes it may be necessary to make a large number of low cost photoprints either from a number of negatives or from a film containing the entire series of negatives from which copies are made in succession. Such work must be done manually, but with a conventional manual printer the sensitized paper must be cut and placed on the negative and then a platen must be manually lowered to keep the paper in close contact with the negative under a certain pressure. Then exposure must be made and thereafter the platen must be lifted and the exposed paper must be removed. With most manual apparatus the film has to be cut before being inserted into the printer.

This operation is slow and tedious to perform for various reasons, one of these reasons being that, if cut paper is used, the paper has a tendency to curl and must be spread and if paper strips from a roll are used the cutting operation can only be performed correctly if the operator keeps the number of copies constantly in mind, a fact which is liable to lead to many errors.

Briefly an operation in which a number of negatives, especially a large number, has to be printed from each of a series of negatives cannot really be performed at low cost on account of the amount of skill which is necessary to carry the operation out.

It is the main object of the invention to provide a completely automatic apparatus capable of automatically printing any predetermined number of positives from any number of negatives which may still be on a film, the automatic operation being not limited to some of the operations, but pertaining to all the phases of operation of the machine so that the manual labor is practically reduced to the setting or adjusting of the machine. After the setting or adjusting operation has been performed the operator may leave the apparatus to itself and only occasionally inspect it, either to renew the sensitized paper supply or to insert a new film with a new series of negatives or in order to effect some change or re-adjustment and to eliminate some irregularity. In fact, therefore, the operator may devote time to other work while the apparatus makes the copies and he may only return to the automatic apparatus occasionally or whenever an alarm signal is received or when some special change or special operation is to be performed.

The principal feature of the invention consists therefore in a completely automatic operation which is automatic in all phases and which permits to make large numbers of copies from each of a relatively large number of negatives.

In addition to this general object of providing a completely automatic photoprinting machine capable of providing any large or small number of copies from each negative of a series which may be aligned on a film, the invention has the further object to provide an apparatus which regulates the number of copies to be printed from each negative of a series which series has also any number of negatives, with the greatest accuracy and reliability so that no loss occurs, the printing of the copy occurring while a very accurate exposure control is exercised which makes all prints alike.

A further main object of the invention consists in providing a photoprinting apparatus which not only advances automatically the sensitized paper for one frame for each copy to be made but which also counts the copies and when the accurate number of copies of one negative has been made automatically changes the negative and then continues to make the required number of prints from the new negative, the machine continuing in this way until the last negative has been printed and the number of copies has been made such as adjusted, whereupon a signal is given to the operator to indicate that the printing has been terminated.

A further object of the invention consists in so constructing the apparatus that by means of hand operated switches it may be hand operated and that practically the same apparatus with small modifications may also be made completely hand operated insofar as driving by an electric motor may be replaced by hand drive thus permitting a rather mechanical operation which however retains many automatic features.

A further object of the invention consists in providing means for adjusting width and length of the photoprint copy to be made in accordance with the size of the negative or the size desired.

A further object of the invention consists in providing electric adjustment for adjusting the paper advance in conformity with the selected picture size.

It is moreover to be understood that the automatic photoprinting apparatus which is essentially described in connection with a contact printing equipment may as well be used if enlargements of negatives have to be made, the design of the automatic printer remaining unchanged and merely the exposure station being changed by the insertion of suitable optical equipment between the negative and the paper on which the copy is made which elements are spaced when running through the exposure station in this case.

Further objects of the invention and further novel features of the same will be explained in connection with the detailed specification describing the more specific features of the automatic photoprinting apparatus according to the invention.

The invention is illustrated in the accompanying drawings showing two embodiments thereof by way of example. It is however to be understood that the two embodiments have been selected to serve as examples in order to explain the principle of the invention and the best mode of applying the principle. It will be obvious to the expert in this art that many of the specific details may be changed or modified and a departure from the examples illustrated is therefore not necessarily a departure from the principle of the invention.

The automatic photoprinting apparatus according to the invention, as described and illustrated, is designed for use in a dark room and is constructed accordingly. Obviously, if it is intended to use the apparatus in daylight the upper portion of the apparatus or the entire apparatus must be enclosed and protected against light.

Figure 1:
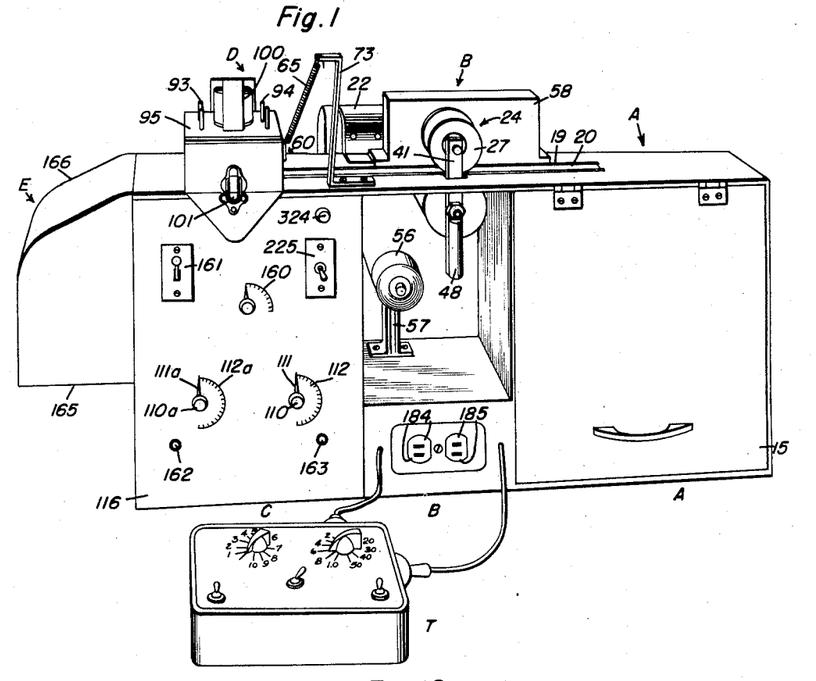
Figure 1 is an outer perspective view of the apparatus.

Referring now to the drawings it will be seen from Figure 1 showing an outer view of the automatic photoprinting apparatus that essentially the apparatus consists of a number of sections. Section A consists essentially of a container for a roll of sensitized paper. The next section B comprises on its top portion a means for drawing the paper from the roll and for advancing it intermittently. In this section also the film roll with a negative film from which the photo copies have to be made, is held. The lower portion of this section contains the transformer and bell and also the contacts for connecting a timer with the photoprinting apparatus.

The next section D contains the platen, the film supporting glass and mask through which the exposure is made and the cutter, cutting the paper after exposure, while the section C on the top of which section D is mounted contains the counter mechanism, the exposure lamps, the control switches and most relay units.

This section also contains the relays and the safety contacts which are operated by the film itself in order to stop the operation of the machine when the film is at an end.

The last section E contains the film advance motor together with the film advance rolls and the contacts cooperating with said rolls and the mechanism which is operated by the film.

The sections A, B, C may all be housed in a single housing 14 which is subdivided into compartments 15, 35, 85. The sections D and E are mounted on the housing or attached to the housing in a manner described below.

The section A of the machine consists only of the compartment 15 carrying an axle 16 on which a roll 18 of sensitized paper is placed which roll is loose on the axle and rotates around it when the paper strip or web 20 is drawn through the apparatus. This compartment, as seen in Figure 1, may be opened at the front to insert the roll of sensitized paper. The compartment is further provided with curved paper guides 19 which may consist of curved plates with edges which are bent over and thus form guide slots holding the marginal portions of the paper strip or web 20, while the plate itself gives the support from below. The guide passes through a slot 21 of the compartment 15 to the outside and ends near the intermittent paper advance mechanism generally indicated at 25 which forms part of section B.

On the top of compartment 35 which forms section B the paper advance mechanism 25 and the means associated with it are mounted. This mechanism includes a main electric drive motor 22 which drives a drive shaft 26 on which the upper paper advance cam roller 24 is keyed or is otherwise fixedly connected with the shaft. The upper paper advance cam roller 24 (Figures 1, 2, 4 and 11) comprises an eccentric roller section 28 which covers only an arc of approximately 90° (or any other fraction of a circle which corresponds to the intended ratio between advance and stopping of the paper web) and which is of a width corresponding to that of the paper web 20 or is slightly larger and which is flanked on both sides by the disks 27. The eccentric cam portion of the advance roller 28 and the disks 27 may be integral to form a single composite cam roller mounted on the shaft 26 and rotating with the same.

The eccentric paper advance roller section 28 is positioned above a cut or slot 31 in the top of the compartment 35 of the housing 14 and through this slot a counter or gripping roller 30 projects slightly which counter or gripping roller cooperates with the eccentric cam roller section 28 and, whenever the eccentric cam roller section faces the gripping roller the paper web is seized between them and is advanced, while the paper rests when the eccentric roller section 28 moves away from the counter or gripping roller 30 during rotation. The top of the counter or gripping roller 30 and its point of contact with the eccentric roller section 28 is preferably in the plane of the paper web 20.

To exert a sufficient gripping pressure the counter roller 30 is journaled on an axle 33 which is supported by bearings 36 which are permanently under the pressure of springs 34. In order to give the structure sufficient strength and in order to provide a support for spring 34 the axle 26 on which the paper advance roller is mounted is supported by bearing shields 41 which form part of a vertical support provided with flanges 46 which are fixedly mounted on the casing 14. These vertical bearing shields or supports are provided with slots 47 through which axle 33 of the counter or gripping roller 30 may pass and at their lower ends these shields are provided with sleeve like cylindrical extensions 48 which are hollow and in which the springs 34 are housed. The springs are supported by a threaded stopper 51 which engages the internally threaded end of the sleeve like extension 48.

The springs support the stems 52 of the bearing 36 in which the axle 33 is held.

Figure 3:
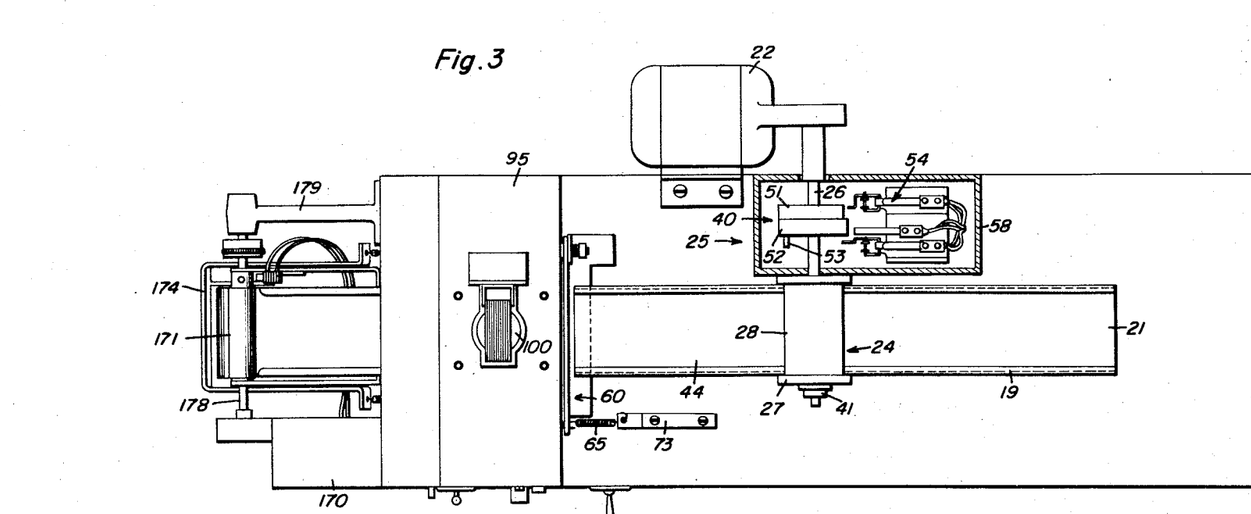
Figure 3 is a plan view of the apparatus.
Figure 4:
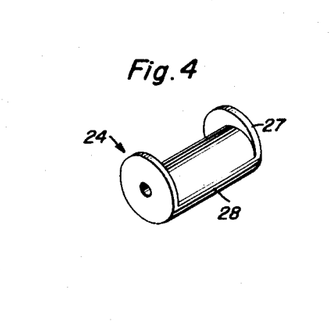
Figure 4 is a perspective view of the eccentric paper strip advance roller.

The shaft 26 of the film advance cam also operates a contact mechanism 40 (Figure 3) which consists of cam disks 51, 52 one of which may carry a pin 53, said disks and pin operating three pairs of contact springs, generally designated by 54, the purpose and function of which will be described in connection with the electrical equipment. This contact mechanism is preferably enclosed in a special casing 58 mounted on top of the compartment 35.

Figure 2:
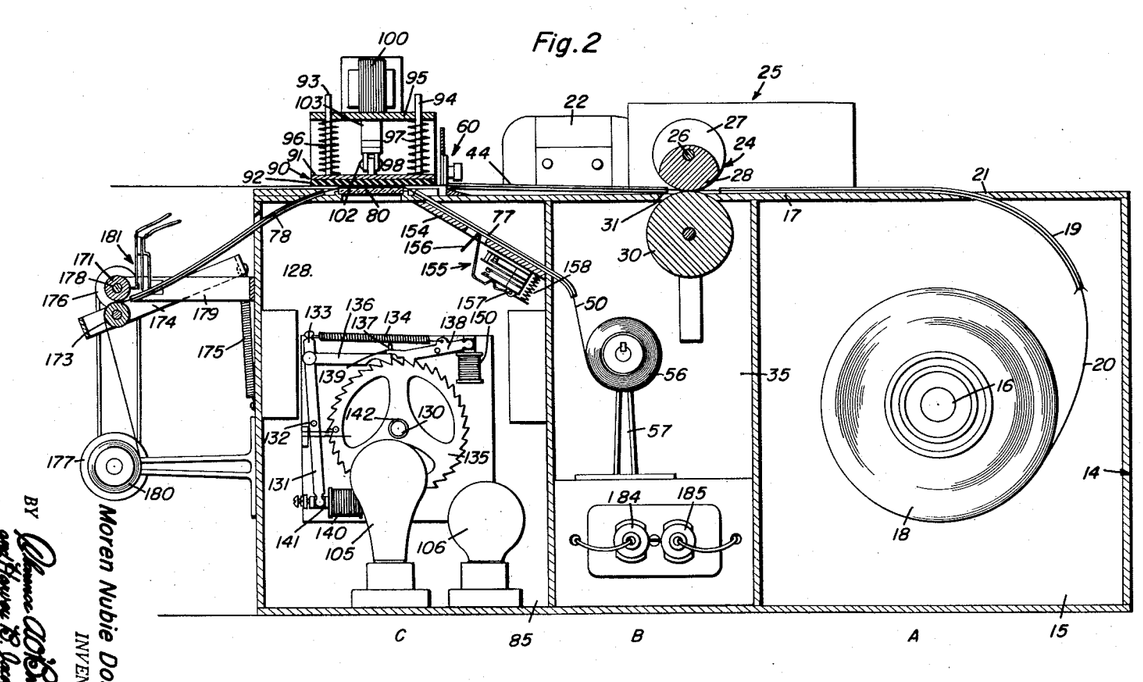
Figure 2 is an elevational cross-sectional view of the apparatus, the section being a longitudinal section along the longitudinal plane of symmetry.

The paper guide 19, as seen in Figure 2, extends up to a point which is in close proximity to the eccentric paper advance cam 28 and another paper guide 44 leads from a point near the eccentric paper cam to the next section.

The compartment 35 further contains the film roll 56 held on a standard 57 which is adapted to hold the customary film roll with the negatives to be copied. From the film roll the film guide 50 is drawn towards the printing position. A film guide 77 is a main portion of which is arranged in compartment 85 of section C projects into the compartment 35. The film guide may consist of a strip of metal the edges of which have been bent over so as to form guide slots in which the marginal portion of the film is securely guided.

The lower portion of the compartment 35 contains the transformer and bell and the sockets 184 and 185 which will be described below in connection with the other electrical equipment.

The sections C, D and E of the apparatus contain the essential mechanism producing the automatic operation.

Figure 5:
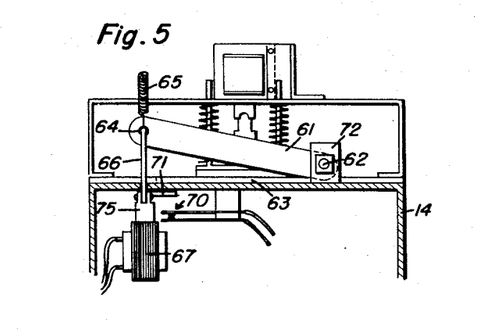
Figure 5 is an elevational view of the cutter.

The top section D includes the cutter 60 for severing from the web or strip that portion of the strip which carries the copies which have been exposed. The cutter, specially illustrated in Figure 5 comprises a cutting knife 61 held on a base plate 63 which cutting knife is arranged transversely with respect to the paper strip or web 20 and is pivoted at 62 by means of a pivot pin held in supports 72. The cutter blade 61 is provided with an eye or eyes 64 into which the end of a tension spring 65 is hooked, which spring is tensioned when the cutter is moved down and therefore pulls the cutter back when the cutter blade is released. The spring 65 is preferably attached to a bent or S-shaped standard 73 which is mounted on top of the casing 14.

A link 66 is connected with the eye 64 and is pivotally connected to the core 75 of a solenoid 67. The energization of the solenoid 67 thus brings the cutter blade 61 instantly down on the paper and severs that part of the paper web or strip 20 which is advanced beyond the cutter from the remainder of the paper web or strip. This paper web or strip 20 is supported close to this point by the edge of the base plate 63 and by the edge of the paper strip guide 44 between which the cutter blade is moved downwardly.

The core of the solenoid is moreover provided with a projecting finger 71 which upon downward movement of the cutter hits the contacts 70 and closes them. The function of the contacts is explained below.

Behind the cutter 60 is the exposure station in which when contact prints are made the paper web or strip 20 is pressed against the negative, while exposure takes place through a glass plate. The top of the compartment 85 is provided for this purpose with a matted or opal glass plate 80 through which the light penetrates and over which the film with the negatives to be exposed in succession is intermittently advanced. The film is delivered to the exposure station by the film guide 77 which is a continuation of the guide already described which projects into the compartment 35.

The film, after having passed over the glass plate 80 enters again a guide 78, similar to the guide 77 which leads the film to section E of the apparatus.

Above the glass plate the platen 90 is arranged which presses the paper web or strip down at the point of exposure. The platen 90 is movable and preferably consists of a metal plate 91 which is lined with some slightly compressible material indicated at 92. The metal plate 91 of the platen 90 is provided with four guide rods 93, 94 which pass through the platen frame 95 and which are surrounded with strong springs 96, 97 which normally hold the platen firmly pressed against the paper web so that the latter is pressed against the negative and glass plate 80.

The platen frame 95 is U-shaped in cross-section and is preferably detachably mounted on the casing 114 in order to make the exposure station accessible from above. The platen frame may be held on the casing by means of a conventional locking device 101 as indicated in Figure 1 of the drawings. The platen is moreover provided with a lug 98 having an eye through which a bolt passes. The bolt is held in a yoke 102 attached to a solenoid core 103 operated by a solenoid 100. The solenoid is fixedly mounted on the platen frame 95.

The platen will thus only be removed from the paper web or strip 20 when the solenoid 100 is energized so that its core 103 lifts the platen against the action of the four strong springs 97, 96 surrounding the guide rods 93, 94. Upon de-energization of the solenoid the platen moves downwardly under considerable pressure, exercised by the four strong springs, and remains in this position until the solenoid is again energized.

The compartment 85 contains the lamp bulbs 105, 106, the bulb 105 which is located below the glass plate 80 being the bulb which is used for the exposure of the print and being selected accordingly. The bulb 106 is a dark room safety bulb (red or orange) as used in darkrooms in connection with the printing and developing of photoprints.

Figures 6, 17:
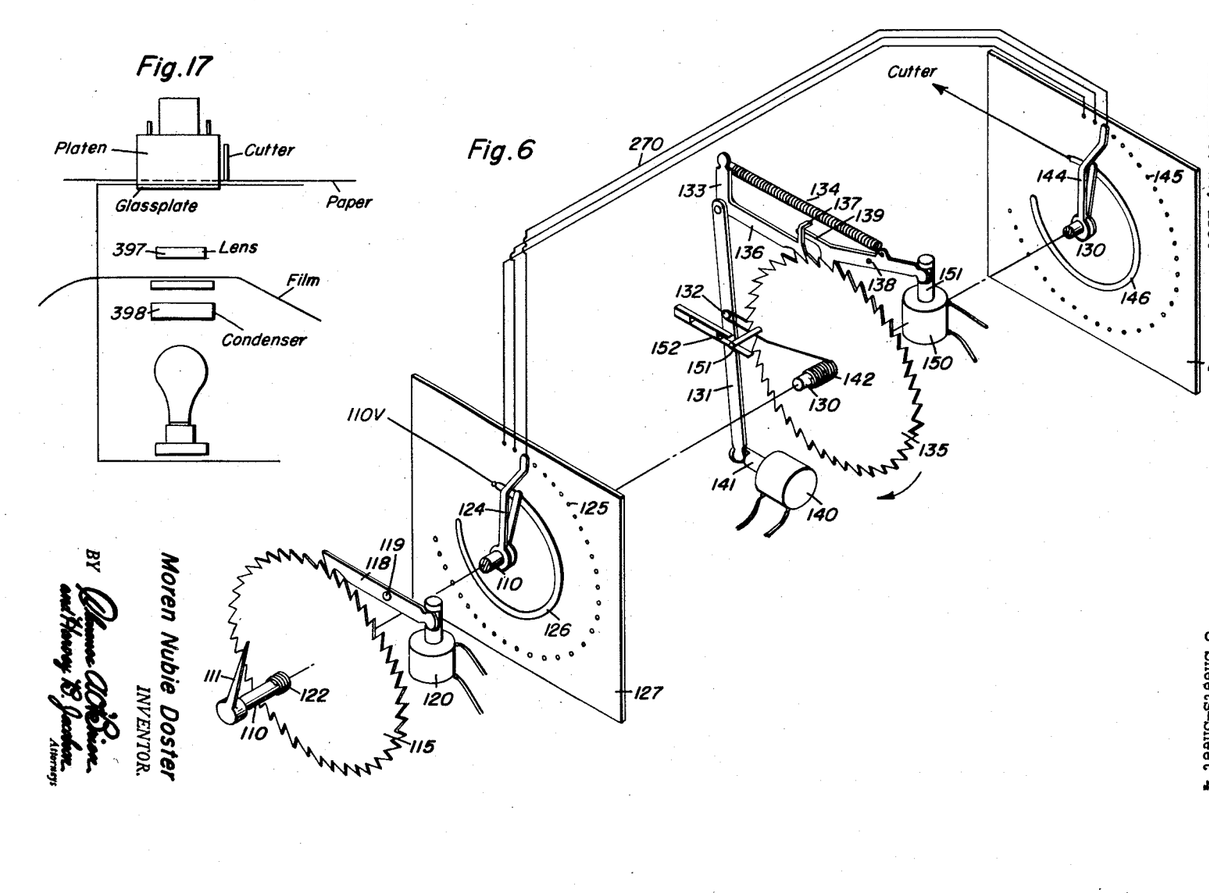
Figure 6 is an exploded perspective view of the counting mechanism and the means for adjusting the counter.
Figure 17 is a block diagram showing, in outline only the arrangement of the parts for the printing of enlarged copies.

The compartment 85 further contains an electro-mechanical copy counter which determines the number of copies which has to be made from a negative. The counter may consist of several units according to the number of copies for which the apparatus is arranged. A decimal counter with two or three counter units, one for each digit of the number to be used in connection with numbers having less than three digits is shown in the diagram Figure 7 while the perspective view in Figure 6 shows a counter which is usually used as a single unit and which is normally usable for a number of copies which does not exceed about fifty. For larger numbers decimal counters are preferable as with large numbers the contacts of the counter which are arranged in a single circular row are liable to be too much crowded and moreover the counter occupies too much space. The decimal counter consists merely of a plurality of units which are mechanically completely alike but which differ with respect to their connections. Therefore, only one unit is to be described, the connection for a plurality of units of a decimal counter is shown in the diagram and is described below.

The counter unit comprises essentially two sections. A first section includes a counter shaft 110 (Figure 6) having an end projecting beyond the front plate 116 (Figure 1) of compartment 85, which end carries a pointer 111 moving on a dial 112. The pointer is moved by the operator to that point of the dial which corresponds to the number of copies to be made from one negative and the shaft 110 is rotated through a corresponding angle when the pointer 111 is moved.

If a plurality of counter units with pointers and dials are used as indicated in Figure 1, the construction of which is alike, corresponding parts are indicated by the same reference numeral, but distinguished by the index *a*.

Each shaft 110 connected with a pointer carries a ratchet wheel 115 with teeth cooperating with a ratchet pawl or dog 118 pivotally held on the front plate 119 and operated by a solenoid 120 which may lift the pawl out of engagement with the ratchet wheel. When so lifted a torsion spring 122 moves the shaft and the ratchet wheel back into the starting or zero position.

The shaft 110 carries at its other end a double contact arm 124 moving with the shaft and sliding on a number of contacts 125 arranged in a circle on an insulated carrier plate 127. Moreover this plate carries a circular contact segment 126 concentric with the series of contacts 125. While a double contact arm is shown obviously only one contact arm is necessary to connect the series of contacts 125 with arcuate contacts 126, the double arm being only used for constructive purposes. The contact arms are preferably insulated from shaft 110 by a means not shown in the drawings.

As will be clear only the member 111 is mounted in front of the front wall 116 while all other members are mounted behind the front wall of compartment 85.

On the rear wall 128 (Figure 2) of compartment 85 a somewhat similar assembly is mounted. This assembly consists of a shaft 130 (Figure 6) carrying a ratchet wheel 135 and a contact arm 144, the latter sweeping over a series of contacts 145 arranged in a circle around the axis of shaft 130 and the concentric circular contact segment 146, the contacts 145 and the circular segment being mounted on an insulated carrier plate 147. The shaft 130 is again attached to a coiled torsion spring 142 the end of which is attached to a fixed point, for instance, the pin 132. The coiled torsion spring returns the shaft to its original position when it has been rotated in the direction of the arrow.

The ratchet wheel 135 in this case is shown as being provided with two ratchet pawls or dogs 136, 138 each of said pawls or dogs engaging the ratchet wheel by means of a tooth projecting therefrom.

The pawl or dog 136 has the shape of a bellcrank lever with its shorter arm 133 attached to a coil spring 134 which, in its turn, is fastened to an eye on pawl 138. Further the pawl 136 is provided with an angular projection 137 forming a nose which may be engaged by a finger 139 projecting from the pawl 138.

The pawl or dog 136 is pivotally mounted on the two armed lever 131 which is fulcrumed on the pivot pin 132 while the other end of said lever 131 engages the solenoid core 141 which is controlled by solenoid 140. When the solenoid is energized the pawl 136 is therefore drawn back and falls into the next tooth of the ratchet wheel 135. During such movement of the pawl 136 the ratchet wheel is held in its position by the pawl 138 until the nose 137 clears the finger 139; when the finger is freed the ratchet wheel may now be advanced by pawl 136 and the latter is moved back by the action of the spring 134 after the de-energization of the solenoid. During such movement of the ratchet wheel the pawl 138 which rests against the teeth of the ratchet wheel, one face of which is inclined will be lifted by said inclined face and fall back into its holding position into which it is drawn by the spring 134. The ratchet wheel is thus advanced in a step by step manner by each operation of the solenoid 140.

In order to return the ratchet wheel to its starting or zero position the solenoid 150 is operated which lifts the dog 138 and pawl 136 simultaneously as the finger 139 catches the projecting nose 137 whereupon the ratchet wheel returns under the action of the coil spring 142. The contacts of the series 125 of the front section of the counter associated with the dial and the contacts 145 of the counter correspond exactly with each other and corresponding contacts are connected with each other by suitable conductors as shown in Figure 6. Thus, a circuit connected with the two segments 126 and 146 is only completed when contact arm 144 is moved by the ratchet wheel 135 and shaft 130 to the same contact of the series to which the contact arm 124 had been previously moved by the operator moving the pointer to a selected point on the dial.

Figure 7:
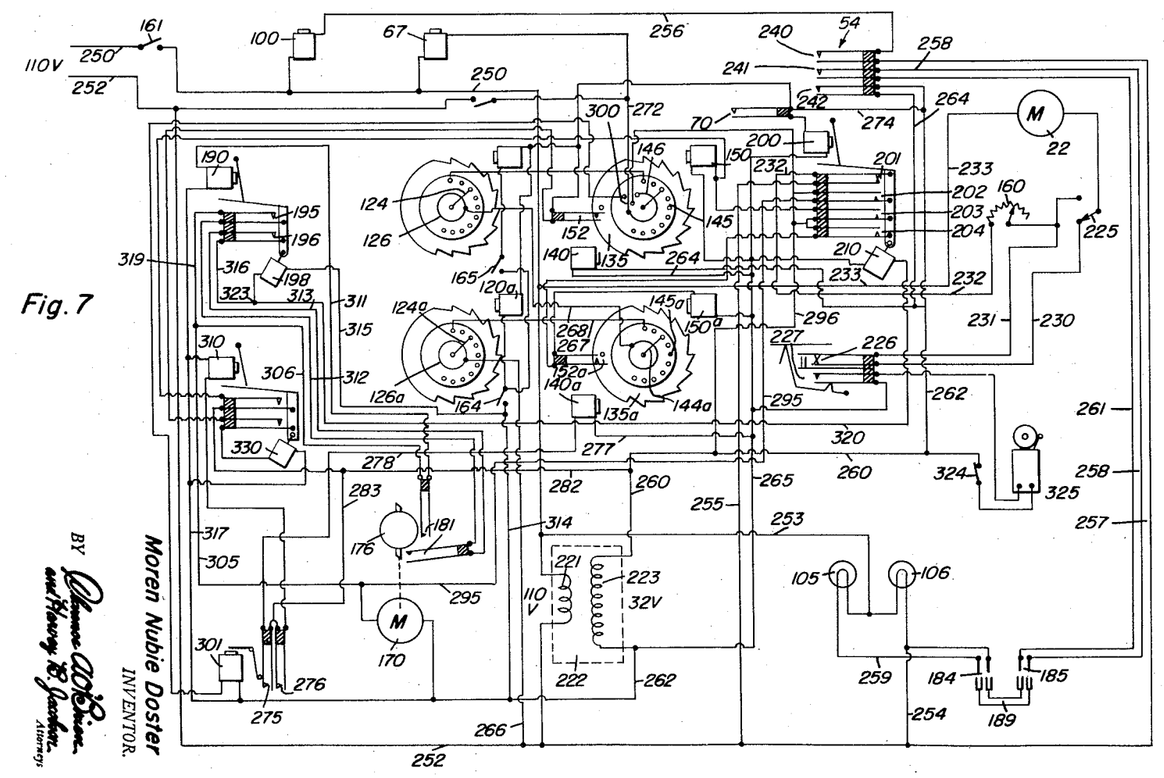
Figure 7 is a diagram of the connections.

As seen in Figure 6 ratchet wheel 135 is further provided with a pin 151 separating the contacts 152 when the ratchet wheel is in its zero position. When a plurality of cooperating counters, for instance, when decimal counters are used, the pins 151 and contacts on different counters are so arranged that the contacts 152 on one counter are opened while the contacts on the other counters are closed by the pin 151 (Figure 7).

In addition to the counter, above described, the compartment 85 houses a number of safety contacts, generally indicated at 155 and described in detail below which are mounted on a board or strut 154 supporting the film guide 77. These safety contacts are operated by a spring pressed feeler 156 applied against the film 50 under pressure. The feeler 156, preferably fulcrumed on a contact support 157, is pressed against the film near its margin by spring 158. Whenever a slot is made in the film in the marginal part thereof at a certain place, for instance, near the end of the film, this slot will permit the feeler to move through the slot thereby closing and opening the contacts of the series 155 as described below.

As further seen in Figure 1, the compartment 85 in addition also houses a rheostat 160 which is located in the operating circuit of the main motor 22 and which serves to control the speed at which the motor operates. This rheostat therefore determines not only the speed of the paper advance and thereby the operating speed of the whole apparatus but also determines the exposure which is adjustable by means of the said rheostat 160.

In addition, the compartment 85 also contains the relays, the transformers and other electrical units of standard construction which are used, the construction of which need not be described.

On the front plate 116 moreover the switches controlling the operation of the apparatus are located. These switches control the operation and permit hand operation or are switches permitting the return of the units to their zero position. More specifically, toggle switch 161 is a master switch for the electrical operation, controlling the supply of current to all units. The switch 162 is a cutter by-pass switch which permits to operate the mechanism by hand under conditions described later, and is used especially for cutting the paper before the prints are made, for cutting off a test strip, for cutting out a bad negative etc. Further, a reset switch 163 resetting the counter to its zero position is shown which is preferably a push button switch. A double pole switch 225 permits to by-pass the contacts controlling the negative film advance, to permit use of the apparatus also for single negatives. Finally, also a switch 324 is arranged permitting to cut out the circuit of the alarm bell after it has been closed to draw the operator's attention to some specific condition during the operation of the apparatus.

The section E of the apparatus contains a compartment formed within a special housing 165 which is attached to the casing 114 and which may be provided at its upper end with an inclined surface 166 forming a chute over which the strips of sensitized papers which have been exposed may slide to a receptacle (not shown) where they may be collected for further processing. If processing in a continuous processing machine is intended means such as rollers (not shown) and similar to rollers 117 are provided to act as take-up rollers for the paper strip.

The compartment essentially houses the film advancing mechanism. This mechanism consists of an electric motor 170 which is preferably supplied with low voltage current and which is mounted on a standard or support which itself is mounted on the outside of casing 114. The motor drives by means of shaft 178 (Figure 3) a film advance roller 171. Another roller 173 preferably mounted on a swingable beam 174 fulcrumed on the standard 179 carrying the roller is pressed against the driven roller by means of a spring 175 attached to the fulcrumed beam 174. Rollers 171 and 173 draw the film with the negatives through guide 78 which runs from a point close to the exposure station to a point close to the contact line between the two rollers 171 and 173. The film is then deflected over the roller 173 towards the take-up roll 180 which is driven by a pulley 177 over which a belt or cord is trained driven by pulley 176 mounted on shaft 178.

The film is advanced exactly through the width of one frame at a time. To obtain such a timed advance the motor circuit is controlled by two contact pairs 181 and 182 (only the former being shown in Figure 2) which are closed by pins or other suitable projections or by cams mounted on the shaft 178. As the control of the film advance is obtained by means of relays it will be explained in connection with the explanation of the circuit operation.

One of the sections (section B in Figures 1 and 2) is provided with sockets 184, 185 which may be used to connect a standard timer T with the circuits regulating the exposure. This timer may also be permanently connected. The timer T is however mainly added in order to provide greater flexibility of the apparatus, and in order to be able to adjust the exposure individually under certain conditions. In itself the timer however is not a necessary appliance. By regulation of the speed of the motor 22 by means of the rheostat 160 and by other means it is possible to regulate the exposure time for the usual type of copies and to vary it according to the density of the copies with the sensitivity of the paper, with the contrasts which it is intended to obtain etc. Additional facilities such as the timer are therefore only necessary in exceptional cases in which said variation will not suffice. The timer T is however very easily detached or attached or connected with the apparatus simply by removing the plug connection between the two sockets which closes the circuit between them and inserting the timer instead of this straight connection.

A modification of the paper advance mechanism arranged on and in the top portion of section C is illustrated in Figures 13 to 16. This modified paper advance mechanism is used whenever copies have to be made of negatives the size of which varies, so that it is necessary to use paper strips or webs of different widths and to adjust the lengths through which the web or strip is advanced during one cycle. In order to use paper strips or webs of different widths it is necessary to adjust the distance between the paper strip guides.

In a practical embodiment of such an adjustable mechanism separate paper strip guides 340, 341, 342, 344 are provided leading to and from the paper strip advance rollers. Each paper strip guide is mounted on a block 350, 351, 353 . . . . These blocks may travel transversely with respect to the direction of the paper strip advance in transversely arranged channels 348, 346. One such channel is shown for each pair 340, 341; 342, 344 of independently movable guides, but it will be clear that a plurality of such channels may be provided for each pair of guides. The paper strip guides 340, 341; 342, 344 are fixed on lugs 354, 355, projecting from the blocks by suitable fixation means such as screws or rivets preferably with countersunk heads.

The channels 346, 348 may consist of elongated square or round prismatic or cylindrical hollow bodies which are practically closed and only provided with a slot 349 at the top through which the lugs 354, 355 of the blocks 350, 351, 352 . . . project upwardly. Each of the blocks is provided with a threaded opening through which a spindle 360 provided with a propelling screw passes. This propelling screw spindle consists of two sections 361, 362 one section being provided with a left and the other with a right hand screw thread. The screw spindle 360 is journaled in angle brackets 365 and an additional bracket 366 may be provided in the middle. At its end screw spindle 360 may be provided with a crank handle 367 or with a sprocket wheel and chain (not shown) which may connect it with the other screw spindle or spindles, so that all spindles may be driven simultaneously by one crank handle.

It will be clear that by moving the crank handle 365 and turning the screw spindle the blocks 350, 351, 352 . . . move inwardly or outwardly according to the direction of rotation of the crank handle; therefore the guides 340, 341 and 342, 344 attached to said blocks may be moved toward each other or away from each other. Preferably on the top board 17 of the casing a graduation scale 368 is arranged so that the operator may easily move the paper strip guides into the desired position. This adjustment is performed before the paper roll is inserted and whenever the size of the copies to be made from the negative changes.

To adjust the extent of the advance of the paper strip to the dimensions of the copy which has to be made in each case, the paper strip advance is obtained by gripping the paper strip or web between two rollers 375, 380, one of which is adjustable. Roller 375 is preferably made of rubber and it may have a relatively narrow tread, much narrower than the width of the paper strip. This roller is mounted on an axle 370 driven by an electric motor 22 in a manner already described.

On both sides of the roller 375 cam disks 372, preferably of insulating material, are mounted each carrying a cam surface 374. The cam surfaces of different disks extend over different arcuate lengths, said arcuate lengths varying in accordance with the lengths of the paper strip advance to be performed.

In the drawing ten cam disks are shown corresponding to ten different lengths of the paper strip advance. The number of copies of different size which can be made is however a multiple of this number as each adjustment of the paper strip advance may be combined with a plurality of paper widths.

Each cam disk 374 cooperates with a pair of contact springs 376 held on an insulating block 377 mounted on top of the casing 15 and each pair of contact springs 376 is also provided with suitable means, such as a projection, lug or spring extension 378 riding the cam surfaces 374, by means of which contact springs 376 which are normally out of contact with each other may be closed.

The length of the sensitized paper strip advanced during one cycle is controlled by means of the movable roller 380 which is mounted on a swingable arm 381, fulcrumed at 382 on an axle held between brackets 384 mounted on the underside of the top board 17 of casing 15. The swingable arm 381 is connected at its end 383 with a spring 385 which, in its turn, is secured to the core 388 of a solenoid 390.

The roller 380 may consist of rubber or may be covered with rubber. It is journaled for free rotation in bearings 386 mounted on the arm 381. The weight of roller 380 is such that normally the roller and arm will drop under the influence of gravity and the roller will therefore be out of contact with the strip of sensitized paper. A spring (not shown) pulling the roller away from the sensitized paper may be used where gravity is not usable.

When the solenoid is energized, the core 388 of the solenoid 390 is drawn into the solenoid whereby the arm 381 and the roller 380 are both moved towards the strip of sensitized paper. The pressure with which the roller 380 is pressed against roller 375 and the strip of sensitized paper is however rendered resilient by means of the interposed spring 385.

Obviously the paper strip will only be gripped by the rollers 375 and 380 and advanced towards the cutter and the exposure station as long as the solenoid 390 is energized. With the de-energization of the solenoid 390 the roller 380 again moves away from the roller 375 thus losing its grip on the paper strip or web 20.

The energization of the solenoid 390 is controlled by the contact springs 376, operated by the cam disks 372 and their cam surfaces 374. It will be understood that the different cam disks carry cam surfaces 374 which are of different arcuate lengths, each cam surface corresponding to a definite advance of the strip or web of sensitized paper.

In order to select the length of the strip advanced during one cycle and which corresponds to one dimension of the printed copy, it is therefore necessary to select a cam surface 374 which will be operative during this cycle. To perform this selection a dial selector 392 is mounted on the front plate of the casing 15 having a pointer or handle 393 which may move over the dial 392. The pointer or handle 393 drives a contact arm 394 (shown only in the diagram Figure 15) which cooperates with a series of contacts 395. Each contact 395 is connected with one pair of contact springs 376 cooperating with one of the cam surfaces 374.

Figures 13, 15:
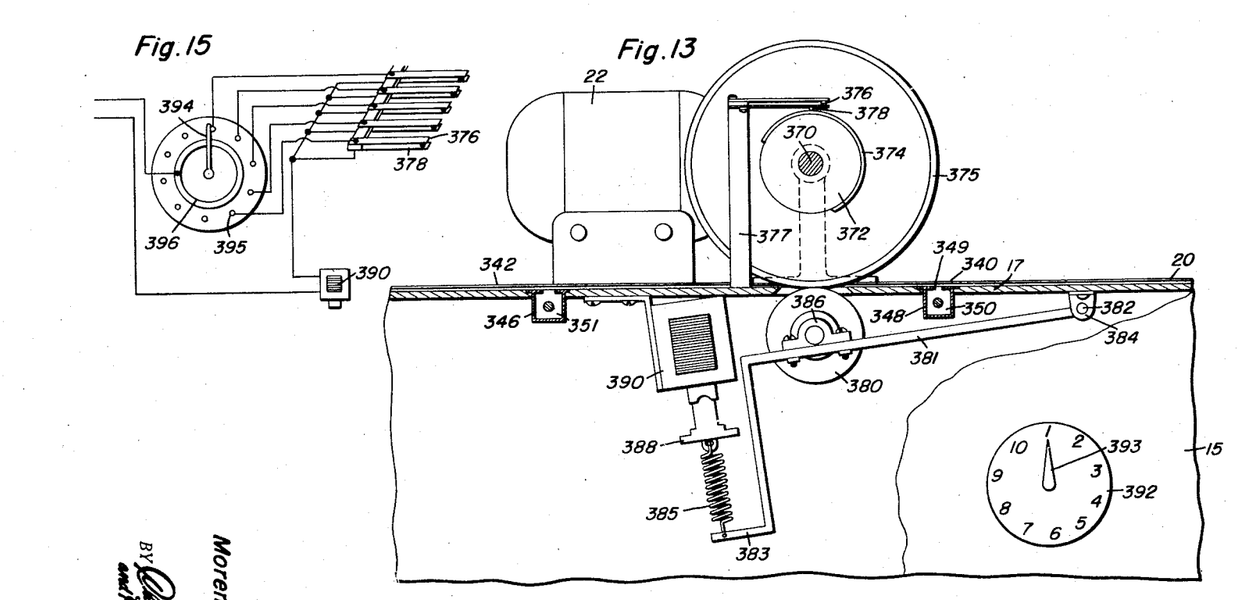
Figure 13 is a partly elevational and partly sectional view of that section of the photoprinting apparatus on which the paper advance mechanism is mounted, showing a modified paper advance mechanism.
Figure 15 is a diagram showing the electrical connections of the cam disk selector used in connection with the mechanism shown in Figures 13 and 14.
Figure 14:
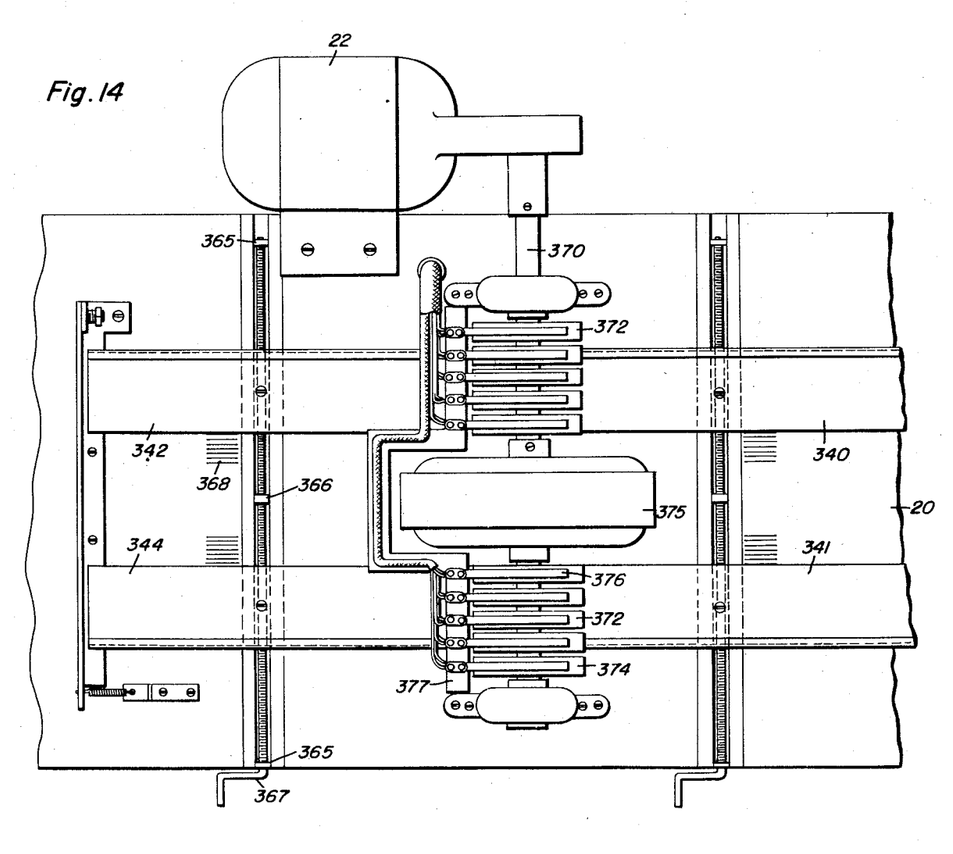
Figure 14 is a plan view of the modified paper advance mechanism.
Figure 16:
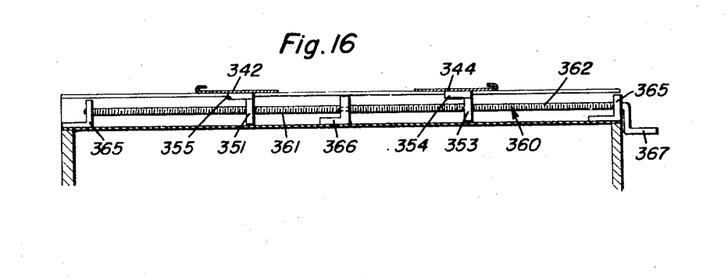
Figure 16 is a partly sectional view of a detail, the section being taken along line 16—16 of Figure 13.

The contact arm 395 also slides on a segment 396 which is connected with a source of current. Obviously, the solenoid 390, as seen in the diagram Figure 15, is only energized by that pair of contacts 376 on which the contact arm 394 rests. The contact pair 376 remains closed as long as its lug or extension 378 rides the cam surface 374, thus maintaining a gripping contact between the rollers 380 and 375 for a definite part of the full cycle or rotation of roller 375 corresponding to the length of the sensitized paper strip to be advanced.

The photoprint produced need not be a contact copy but may be an enlargement and Figure 17 diagrammatically illustrates the modification of the apparatus which takes place if such enlargements are produced instead of contact prints.

The arrangement is essentially the same and departs only from that shown in Figure 2 insofar as the film carrying negative or negatives is drawn through the exposure station a suitable distance from the sensitized paper strip, a suitable optical arrangement 397 being interposed between the said film and the paper strip 20. If necessary, a condenser lens 398 may be used which is inserted between the source of light and the negative carrying film 50.

The height of the table supporting the sensitized paper strip may of course be adjustable.

Figure 8:
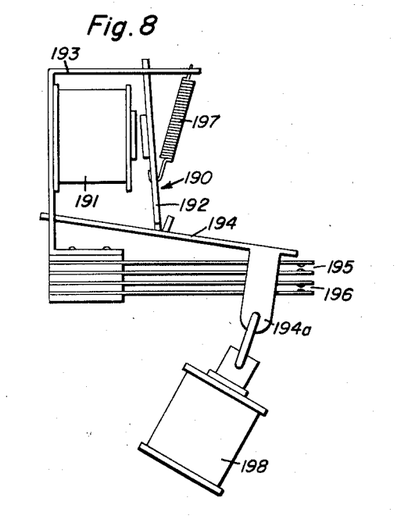
Figures 8 and 9 are elevational side views of the relays which are preferably used.
Figure 9:
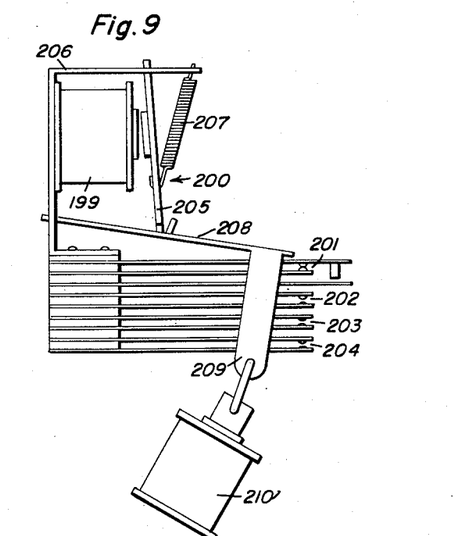
Figures 10, 11:
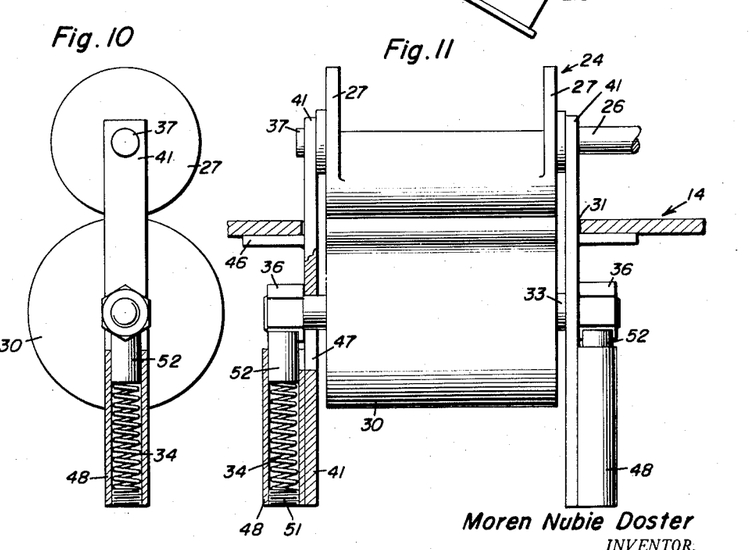
Figures 10 and 11 are elevational side views partly in section at right angles to each other of the means for advancing a strip of sensitized paper.

The electrical equipment in addition to the units already described uses mostly standard units, such as transformers, relays, solenoids, etc. The relays are also a standard type of relay; they are however of a self locking type and are therefore separately illustrated in Figures 8 and 9. Each relay comprises a relay coil 191 or 199 which operates a spring tensioned armature 192 or 205. The armature is hingedly mounted on the frame 193 or 206 on which also the coil springs 197 and 207 drawing the armature away from the relay are mounted. The armature cooperates with an armature bar 194 or 208 which is also hinged to the frame 193, 206 preferably by merely inserting the end of the armature bar through a slot. The armature bar is provided with a slot or opening into which the hooked end of the armature may enter. The frames 193, 206 moreover carry the insulating sockets of the relay contacts 195, 196 of relay 190 and 201, 202, 203, 204 for relay 200. The relays are both shown in the position into which the energization of the release solenoids 198 or 210 has brought them.

Each armature bar 194, 208 is provided with a depending operating arm 194a, 209 which is attached to the core of the release solenoid and which is provided with means for operating the contacts of the relay.

When the relay armature is attracted by the coil 199 or 191 the armature enters into a slot and its hook retains the armature bar 194, 208 in its lifted position. In this position for instance contacts 195 and 196 or 202, 203, 204 are closed while with relay 200 the contacts 201 are opened. After the relay coil has been deenergized the armature remains in this position as it is hooked under the relay bar and the relay and armature bar are therefore locked. This operation also has drawn out the cores from the solenoids 198 and 210. Upon energization of the solenoids the armature bars are again pulled down thus releasing the armature which is brought back into its position by the spring 197, 207. It will be understood that this relay is also a standard construction and is no part of this invention.

The electrical connections will be best understood by describing a full cycle of operation. For technical reasons it has been found to be of advantage to provide circuits of two different types. One group of circuits is directly supplied with the usual A. C. from a network of 110 v. or any other standard voltage which may be provided in the particular region. Another group of circuits is however supplied by a current of low voltage which is generated in a transformer 222 lodged in one of the compartments and furnishing at its secondary a lower voltage for instance 30–32 v. This supply of circuits with two different voltages has been selected in order to avoid arcing at the contacts and in order to reduce the problems of insulation.

The operation as will be understood is fully automatic so that any number of prints may be made from a single negative or any number of prints may be made from each negative on a film roll, and if no change in the number of prints or the number of negatives on which prints are to be made is desired after the apparatus has been adjusted, the operator may leave the apparatus alone and may turn his attention to other work while the apparatus turns out the required numbers of prints. Attention is solely to be paid to the safety signals or other signals which indicate that the job has been completed, or that a film is at its end, or that the paper roll is exhausted, or that the job has progressed to a predetermined point where the operator may introduce a change or a manual operation.

The type of photoprinting to be performed may, for instance, consist in making a large number of prints, say, for instance, seventy-five from each negative, on a film strip which contains twenty-four or more negatives. These seventy-five copies printed from a single negative form a strip of paper which after development, fixation etc. is then finished in the usual manner by the operator. It is preferable to make all copies from a single negative on a strip on account of the tendency of the paper to curl which makes it more difficult to handle a single copy, and also because the strip eliminates the necessity of sorting the individual prints.

In order to perform such a printing operation the operator proceeds by adjusting his counter or his counters. If decimal counters are used, as indicated for instance in Figure 7, counter No. 1 indicates the counter for the units, counter No. 2 indicates the counter for the tens from 10 to 100 and if any further counter is used, it would count from 100 to 1000 etc. Assuming, therefore, that seventy-five copies are made the pointer 111 on dial 1 is moved to mark 5 the pointer 111a on dial 2 is moved to mark 7.

As has already been stated above, the apparatus is operated in the dark room when constructed in the manner indicated in which the sensitized paper is not protected against light. It must also be provided with a roll of sensitized paper which has to be inserted into the guide 19 and likewise the film roll 56 has to be inserted in its proper place and the film has to be inserted into guide 77. The ends of the film and of the sensitized paper must be brought into the proper place to start work.

Further, the operator has to adjust the rheostat 160, thus determining the exposure time and also the speed of operation of the apparatus. In the modification illustrated in Figures 13 to 16 the width of the paper strip and the length of the strip advanced during each cycle is also adjusted in the manner already described.

Further the motor switch 225 is brought into the desired position.

After this preparatory adjustment work has been performed the operator may close the master switch 161 thereby closing the circuit of the transformer 222 which forms the source for the low voltage current. The circuit includes the primary 221 of the transformer 222 and is closed over the two conductors 250, 252. Simultaneously, also the circuit of the red lamp or dark room safety lamp 106 is closed over 250, 253, 254, 252.

When the switch 225 is in the position shown in Figure 7 the circuit of the motor 22 is controlled by the contacts 226 of the set of contacts 155 which is the set controlled by the feeler 156, urged against the margin of the film, which is operated by a slot made in the film margin through which the feeler may be pushed. Further the circuit of the motor 250, 233, 22, 225, 230, 226, 231, 160, 232, 201, 255, 252, includes also the normally closed contacts 201 of relay 200 and the energization of the motor 22 is therefore dependent on said relay, hereinafter termed relay No. 1.

When the electric motor 22 starts to operate, it turns shaft 26 and therefore also the eccentric paper advancer cam roller 24. As soon as the cam segment 28 is moved to engagement with roller 30 it starts to grip the paper strip; the latter is advanced between the cam segment 28 and the roller 30 and a section of the sensitized paper is now moved into the exposure station above the negative supposed to have been brought into position above the glass plate 80 and is now ready for exposure.

The paper strip or web 20 is only advanced as long as the eccentric cam segment 28 faces the roller 30 and the paper advance therefore stops when the cam segment 28 moves away from roller 30, so that the paper strip comes to a standstill and rests while the cam segment continues to rotate until it reaches again the point where it will make contact with the paper strip and roller 30. During this period of rest exposure is made.

When the shaft 26 starts to rotate also the cams 51 and 52 with the pins 53 are rotated closing the contacts 240, 241, 242 of the cam operated contact set 54. Contact 240 closes the circuit of the solenoid 100 (250, 100, 256, contacts 240, 257, 252) which raises the platen 90 thus permitting the paper strip to advance over the negative. The cams operating the contacts are so shaped that the platen remains raised as long as the paper strip advances, but as soon as the gripping of the paper between the eccentric roller 28 and the roller 30 ceases and the strip ceases to advance deenergization of solenoid 100 causes the platen 90 to move back under the pressure of its springs, holding the paper firmly against the negative and pressing the paper and negative against the glass plate.

The second cam 52 is so arranged that approximately simultaneously with or shortly after the de-energization of the solenoid 100 the contacts 241 are closed, which contacts control the circuit of the exposure lamp 105 which is now lighted over the circuit 250, 253, 105, 259, one contact of 184 and 185, 258, 241, 261, the other contact of 185, 184, 254, 252.

It is assumed that in this case no timer is used and the contacts 184, 185 are simply bridged and connected with each other. If a timer is used the connection 189 is removed and the timer is connected with the contacts 184, 185. It will be clear that the exposure would be controlled by the timer within the limits set by the automatic operation, or when the latter is not used, the timer may produce any exposure of any length in such a case.

During rotation of shaft 26 also the pin 53 closes the third contact 242 of the contact set 54 and closes this contact momentarily. This closure of the contact 242 operates the counter which has been previously set by the operator.

The operation so far described has been carried out within circuits supplied by the network voltage. Contact 242, however, operates a low voltage circuit connected with the secondary 223 of the transformer 222.

This low voltage circuit operates the ratchet wheel advance solenoid 140 of the unit counter (counter No. 1) over the transformer supplied circuit 223, 260, 262, 242, 264, 140, 264, 265 back to 223. The solenoid 140 is thus operated once for each turn of the shaft 26 and for each period of intermittent paper advance and thereby the ratchet wheel 135 is advanced for one step.

If it is now assumed for instance that only one counter is used and that only five copies should be made, then the pointer 111 will have been moved to mark No. 5 on the dial and the arm 124 has been moved to contact No. 5, and after five steps the circuit would be closed, the decimal counter counting the tens (counter No. 2 and dial No. 2) being then in the zero position.

After the five steps have been performed the cutter 60 will be operated by its solenoid 67 over circuit 252, 266, 126a, 124a, the zero contact of the contact series 125a connected by conductor 267 with the zero contact of the series 145a on counter No. 2, 268, 126, the conductor 270 of the fifth contact on which the contact arm 124 rests, the fifth contact of the counter contact series 145, 146, 272, 67, 250. If however it is assumed as in the first named example that seventy-five copies have to be made, the pointer on dial No. 2 is set on the mark 7 and the pointer on dial No. 1 is again set on mark 5. In this case the above described circuit would not be closed as contact arms 124a and 144a are not in the zero position and the counter No. 1 ratchet wheel 135 is then stepped over all its contacts until it reaches the contact 300. Thereby an energizing circuit is closed for the relay 301 (relay No. 4) which closes its contacts 275.

The closing of contacts 275 of relay No. 4 energizes solenoid 140a (circuit 260, 282, 283, 275, 278, 140a, 277, 265, and 223) and advances the ratchet wheel 135a of counter No. 2 for one step. This operation continues until after seven full revolutions of the ratchet 135 of counter No. 1 the contact 5 is again reached.

The cutter is then operated in the manner indicated above, but the circuit is now completed by the connection between contact No. 7 on dial No. 2 and contact No. 7 on counter No. 2 instead of being completed over the zero contacts as in the first example given. It will be understood that in the meantime the ratchet wheel 135 will have performed seventy steps corresponding to seventy copies made from the negative before the last five steps which have been described above, are performed.

During every step the strip of sensitized paper is advanced the platen is withdrawn and the exposure lamp bulb is lighted. Only after the seventy-five steps have been performed the cutter is operated and the exposed part of the sensitized paper strip severed from the unexposed portion.

It has been mentioned above that the relay 301 (relay No. 4) has been energized and thereby also the contacts 276 have been closed. The closure of these contacts energizes relay 310 (relay No. 3) for a purpose which will appear below and which is connected with the advance of the film.

After seventy-five copies have been made by advancing the strip of sensitized paper seventy-five times and after the cutter has severed the seventy-five exposed portions of the sensitized paper strip from the remainder of the strip, the strip falls down by gravity and is collected in a manner not shown for further treatment. However, when the cutter has been operated also the cutter contacts 70 were operated, closing a low voltage circuit over relay 200 (relay No. 1) whereby the contacts 201 are opened, the contacts 202, 203 and 204 are closed. The openings of the contacts 201 opens the circuit of the main motor 22 which therefore stops to operate. At this time the motor 170 connected with the film advance starts to run, the circuit being closed at contacts 202 of relay No. 1 (circuit 260, 296, 202, 295, motor 170, 262).

When the film advance motor 170 operates the disk 176 is rotated which by means of the pins projecting from said disk operate the contacts 181 and 181a in order to advance the film through one frame. The two contacts 181 and 181a limit the advance as will be seen.

The closing of the contacts 203 of the relay 200 (relay No. 1) closes the circuit of the reset solenoid 150 of the counter No. 1 ratchet 135 which lifts the pawl 138 and returns the ratchet wheel contact arm to its original position. The return of the ratchet wheel to its original position also closes the contacts 152.

Simultaneously also the contacts 204 of relay 200 (relay No. 1) close the circuit of the reset solenoid 150a of counter No. 2 which returns counter No. 2 ratchet wheel into its original position, opening again the contacts 152a.

It will be noted that the solenoid 150a therefore can only be energized when the ratchet wheel 135a has been moved from its zero position.

Returning now to the film advance, the film advance motor 170 rotating the disk 176 provided with pins first closes contacts 181 which contacts close the circuit of relay 190 (relay No. 2). This circuit branches off from conductor 295 leading to motor 170 and is closed over line 305, 306, contacts 181, 311, relay 190, 317 262. Relay 190 (relay No. 2) is a self locking relay. When energized, it closes the circuit over contacts 181a by connecting them at contacts 195 with the conductor 295 energizing the motor 170.

The closing of contact 181a closes circuit of the reset solenoids 198 and 210 resetting relays 200, and 190 over a low voltage circuit branching off from conductor 295 supplying the film advance motor 170 and closed over 305, 319, 195, 312, contacts 181a, 313, contacts 196, 316, solenoid 198, 315, 314, 262. The solenoid 210 is operated by the same circuit branching off at 323 and leading over 321, 210 to conductor 265. When these solenoids operate the relays No. 1 and No. 2 (200 and 190, respectively) are reset thus stopping motor 170 and bringing the apparatus back into its original starting position, in which the motor 22 advancing the strip of sensitized paper is again switched in at contacts 201.

When relay 301 (relay No. 4) was operated also the contacts 276 were closed which contacts closed the energizing circuit or relay 310 (relay No. 3). This last named relay provides an independent resetting circuit for the counting solenoids 150 of counter No. 1. Moreover this relay closes a circuit for its own reset solenoid 330 which includes the contacts 152 of the ratchet mechanism of counter No. 1. When the ratchet wheel 135 therefore returns to its original position the relay No. 3 is also reset.

After the original setting of the apparatus has been restored the making of copies from the negative which has been advanced by the operation of motor 170 into the exposure position may start.

It has been mentioned above that a cutter by-pass switch 163 is arranged (not shown in the diagram) by means of which the contacts 70 or contacts parallel to said contacts may be closed manually so that the operator can start the film advance at any time at which such operation seems to be necessary, without waiting for the cutter to operate. This cutter by-pass switch may be used in the manual operation of the apparatus as intended or when the operator intends to interrupt the making of copies from one negative and starts the making of copies from the next negative on the film.

The film carrying the negative is further provided with a perforation or slot at its margin, as already explained above, and when this slot passes the opening of the feeler 156 the latter which was sliding on the film under a certain pressure is now moved through the slot by a spring 158 whereby the set of contacts 155 is operated. This set of contacts consists of two contact pairs 226 and 227. The pair 226 opens the circuit of the motor 22 thus stopping the operation of the motor and thereby the advance of the strip of sensitized paper. The contact pair 227 closes the circuit of the bell 325 thus giving an alarm signal and informing the operator that the film roll is at an end. The slot may of course also be made into the film at any other place at which the operator wants to be informed that a change to be introduced manually has to be made. For instance the film strip may contain several groups of negatives and a different number of copies should be made from the negatives in the different groups. The operator in such a case may make a perforation between the groups which enables him to stop the paper advance automatically when the work has progressed to a point where a change is desirable and may then reset the counter or counters for the next group.

The paper strip may be supervised in exactly the same manner; an alarm signal may be given when the paper roll is at an end. This, however, is not illustrated in the drawing.

After the operation has been terminated the dials may be reset and this resetting of the dials may be produced by a number of manual switches 165, 164. The closing of these two switches closes the resetting solenoids of the dials and energizes the solenoids 120, 120a and thereby lifts the pawl 118, of the ratchet wheel 115 so that the latter may return to its starting or zero position through the action of coiled torsion spring 122.

A further switch 324 permits to cut out the bell 325 after the alarm has been given.

The switch 225 may also be turned to the second position. In this case the set of contacts 155 is by-passed and the operator may use the motor driven paper advance in order to make prints from individual negatives or in order to make prints in those cases in which the negatives are not on a roll film.

Figure 12:
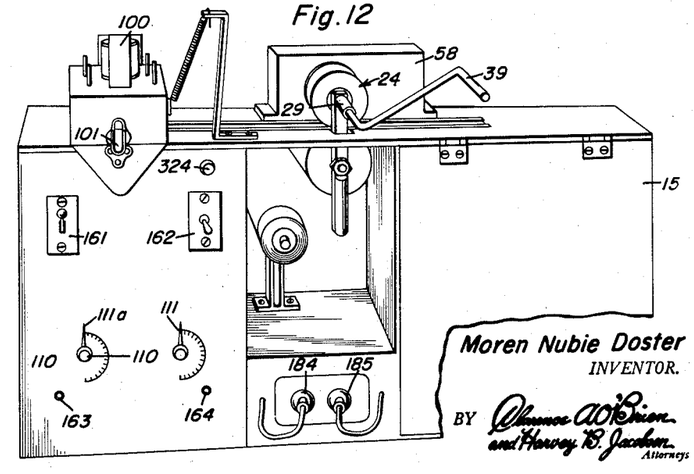
Figure 12 is a perspective view of a simplified automatic printing apparatus in which a hand drive is arranged instead of the electrical driving means.

The apparatus may also be constructed as a semi-automatic apparatus in which the film advance is performed by hand while the paper advance is obtained by a hand crank. This modification is shown in Figure 12. The construction is essentially the same as that described, only section E is entirely omitted while shaft 26 is provided with an extension 29 coupled with a hand operated crank 39. The operator in this case proceeds by turning the hand crank after having adjusted the other controls in the manner described for the fully automatic apparatus. He continues to turn the crank until the requisite number of copies have been exposed. He then pulls out the film for the next negative by hand. This apparatus is thus simplified and may be built at reduced cost without losing its utility with regard to the automatic counting and production of a preset number of prints from a negative.

It will thus be seen that the automatic photoprinter which has been described provides a relatively simple but fully automatic device for making any number of prints, starting from a single print to a very large number, numbering in hundreds and more, either from a single negative or from a number of negatives arranged in succession on a film roll, one after the other, while not only maintaining a completely accurate count, but also maintaining an accurate exposure control. Moreover the apparatus separates the prints made from one negative from those made from another negative by cutting and links this cutting operation to a change of the negative so that no mixing up of the prints made from different negatives can occur. Further the apparatus also supervises its own function and cuts itself out when the last negative has been printed or the paper supply gives out.

The apparatus draws its power from a single source of energy, although operating with a plurality of voltages if need be, and on account of the low voltage used in many circuits and on account of the electric control shows very little wear. The manual effort necessary for operating the apparatus is very small and therefore it is possible for every operator to attend to and to service the apparatus while engaged in performing other photographing jobs. The apparatus is thus most valuable as a time saver.

It will be clear that the construction in detail is subject to many modifications without in any way departing from the essence of the invention as defined in the annexed claims.

What is claimed as new is as follows:

1. An automatic photoprinting apparatus for making prints successively from a plurality of negatives on a continuous web of sensitized sheet material, comprising a continuous film carrying the negatives from which the photoprints are made, web gripping means intermittently gripping and advancing the web of sensitized sheet material stepwise towards and into an exposure station, each advancing step covering a length corresponding to the width of a photoprint made from one negative driving means for the said web gripping means, film advancing means stepwise advancing the negative carrying film towards the exposure station in a direction differing from the direction of advance of the continuous web, each step of the film advance moving the same through a distance corresponding to the width of a negative, driving means for said film advancing means, web cutting means arranged near the continuous web in front of the exposure station in the direction of advance of the web of sensitized material, controlling means for said web cutting means, including a counter mechanism with an adjustable presetting mechanism controlling the stepwise advance of the continuous web of sensitized material, said controlling means operating the cutting means after a predetermined number of stepwise advances of the web have been made exposure lamps for exposing the sensitized sheet material advanced into the exposure station, withdrawable pressure means in said exposure station for holding the continuous web of sensitized material during exposure, withdrawing means for relieving said pressure and freeing the continuous web of sensitized material controlled by said driving means of the web cutting means, driving means for said web gripping means, said driving means also operating exposure control means controlling the exposure lamps and said pressure applying and relieving means, operating them between successive web advance producing steps of the web gripping device, said cutting means being provided with control means controlling the driving means of the web gripping means, and also the driving means for the film advance means, the former being cut out and the latter being cut in in one operation of the cutter device.

2. An automatic photoprinting apparatus as claimed in claim 1 wherein the pressure applying means consists of a platen provided with guide rods, a platen frame forming a supporting structure for the platen and provided with guiding apertures for the guide rods, spring means surrounding said guide rods and pressing said platen normally against the web of sensitized sheet material and against the negative in the exposure station, a solenoid supported by said frame having a core connected with said platen for lifting the latter against spring action, a control circuit for said solenoid, and contact means controlled by the drive means for the web advancing means for closing said solenoid control circuit upon each stepwise advance of the web.

3. An automatic photoprinting apparatus according to claim 1 wherein the means for intermittently advancing the transparent negative carrying film include driving means comprising an electric motor having an energizing circuit, gripping rollers advancing said transparent negative carrying film, a contact closing device operated by a shaft driven by the driving means, contacts operated at regularly timed intervals by said contact closing device, said contacts controlling the energizing circuit of the electric motor and interrupting the energizing circuit of the same, after the advance of the negative carrying film through one frame.

4. An automatic photoprinting apparatus according to claim 1 wherein the means for cutting the sensitized sheet material comprise a cutter blade pivotally mounted on a base plate, a spring holding the cutter plate in an elevated position, a solenoid provided with a core, a link connecting said cutter blade with said core and pivoted to said cutter blade, for pulling the cutter blade towards and through the sensitized sheet material upon energization of the solenoid and an energizing circuit for said solenoid controlled by the counting means, a contact operating device carried by said cutter, a contact device operated by said contact operating device, said contact device being operated upon operation of the cutter and controlling the operation of the driving means for the means for intermittently advancing the sensitized sheet material, advancing the web, the said driving means including a motor with an energizing circuit interrupted by the aforesaid contact device so as to prevent any further advance of the web of sensitized sheet material, said contact device further controlling the means for advancing the transparent negative carrying film, the last named means including a drive motor and an energizing circuit closed upon operation of said contact device.

5. An automatic photoprinting apparatus according to claim 1 wherein the means for counting the advancing steps of the web of sensitized sheet material comprise a first series of spaced counter contacts, a counter contact arm, moving over said counter contact series step by step and from contact to contact, means for moving said counter contact arm, a further series of dial contacts, each of said dial contacts corresponding to one contact of the first named series of counter contacts and electrically connected with the same, a manually movable dial contact arm adapted to be preset on a selected dial contact of the dial contact series, a stepping device for the first named counter contact arm moving the same step by step and from contact to contact and operated by the means for advancing the web of sensitized sheet material, said stepping device being operated once for each step advancing the web of sensitized sheet material, and a circuit controlling the cutter operating device closed when the counter contact arm has been moved to a position in which the counter contact corresponds to the dial contact of the dial contact series to which the dial contact arm has been moved.

6. An automatic photoprinting apparatus as claimed in claim 5 wherein the stepping device for the counter contact arm comprises a ratchet wheel, a stepping pawl, a solenoid operating said pawl, an energizing circuit for said solenoid, said circuit being connected with a contact device operated by the means for intermittently advancing the web of sensitized sheet material at the end of each advance of the said web of said sensitized sheet material.

7. An automatic photoprinting apparatus as claimed in claim 5 wherein the stepping device for the counter contact arm comprises a ratchet wheel, a stepping pawl, a coiled tension spring to bring the ratchet wheel back to its starting position, a holding pawl, a contact making member connected with said ratchet wheel and contacts operated by the contact making member upon return of the ratchet wheel to its starting position upon release of the holding pawl.

8. An automatic photoprinting apparatus as claimed in claim 5 wherein the means for counting the number of exposures made from one negative and the advance steps of the web of sensitized sheet material comprise a plurality of counter devices, each counter device including a series of spaced counter contacts and a counter contact arm moved step by step over the said contact series from contact to contact, a stepping device for moving said counter contact arm, including a ratchet wheel and a stepping pawl, electromagnetic means for operating the stepping pawl, a special contact on a first one of said counter devices contacted by the counter contact arm when the arm has been moved over the entire counter contact series, a circuit connected with said special contact and means in said circuit for energizing the stepping device of a further contact device once when the special contact on the first counter device has been reached by the counter contact arm of said device, thus moving the counter contact arm of said further counter device for one step when the counter contact arm of the first counter device has been moved over the entire series of counter contacts, a dial device for each of said counter devices, including a manually movable dial contact arm and a series of dial contacts, the contacts of the dial device of each counter device being connected with corresponding counter contacts of the same counter device to complete a circuit whenever the counter contact arm of a counter device has been moved step by step to a counter contact corresponding to the dial contact of a dial device on which the dial arm of said dial device has been manually preset, counter and dial contact arms of the counter and dial devices of all counter devices, when moved to corresponding positions completing a circuit controlling the operating device of the cutter, the stepping device of the first one of the counter devices being controlled by the means for advancing the web of sensitized sheet material, the counter contact arm of said first counter device being thus moved stepwise once for every advance step of the web of sensitized sheet material while the further counter devices are moved upon completion of a series of steps corresponding to the number of counter contacts in the counter contact series of the first counter.

9. An automatic photoprinting apparatus as claimed in claim 5 wherein the means for counting the number of exposures made from one negative and the number of advance steps of the web of sensitized sheet material include decimal counters, each counter having a series of ten contacts, one contact device being the unit counter, having a special contact, the counter contact arm being movable over each contact series in each counter device, a dial device for each contact device, each dial device including a series of ten dial contacts and a dial contact arm, adapted to be moved manually over the dial contact series, a stepping device for each counter contact arm, said stepping device including a ratchet wheel, a stepping pawl, and a stepping solenoid operating said pawl, said stepping solenoid being energized in the unit counter device for advancing the web of sensitized sheet material, and said stepping device in the other counters being energized over a circuit closed when the counter contact arm of the unit device is moved to the special contact of the said unit counter, a contact making device on the ratchet wheel of each counter, a coiled tension spring adapted to return the ratchet wheel of each counter and the counter contact arm into their starting position, contacts operated by said contact making device on the ratchet wheel, the last named contacts being closed on the unit counter and opened on all other decimal counters, a ratchet wheel on the dial device of each counter, a pawl for holding said ratchet wheel of each dial device, electromagnetic means for disengaging said holding pawl of the dial device, an energizing circuit for said electromagnetic means, and a manual switch closing said energizing circuit thus returning the dial devices into their original position.

10. An automatic photoprinting apparatus as claimed in claim 5 wherein a first relay is provided having an energizing circuit controlled by contacts operated when the cutter is operated, said relay when energized opening the energizing circuit of the motor advancing the web of sensitized sheet material, and closing the circuit of a motor advancing the negative carrying film, said relay upon de-energization closing again the circuit of the first mentioned motor advancing the web of sensitized sheet material and opening the circuit of the film advance motor, said relay further closing the circuits of electromagnetic devices returning the counter contact arms into their starting position.

11. An automatic photoprinting apparatus as claimed in claim 5 wherein a first relay is provided having an energizing circuit controlled by contacts operated during the operation of the cutter, said relay when energized opening the energized circuit of the motor advancing the web of sensitized sheet material, and closing the circuit of the motor advancing the negative carrying film, said relay upon de-energization closing again the circuit of the first mentioned motor advancing the web of said sensitized sheet material and opening the circuit of the film advancing motor, and closing the circuits of electromagnetic devices provided in the counter mechanisms and returning the counter contact arms into their starting position, and wherein the film advance mechanism includes a drive mechanism provided with contact apparatus, a first and a second contact device operated by the said contact apparatus at different times, the first contact device closing the circuit containing a second relay, provided with relay contacts closing circuits connected with the second contact device, each of the two relays being self locking and each being provided with an electromagnetic release device, closure of the second contact device operating the release device of the relays and opening the circuit of the film advance motor thus arresting the further film advance and closing the circuit of the advance motor of the web of said sensitized sheet material.

12. An automatic photoprinting apparatus as claimed in claim 5 wherein the energizing circuit of the motor advancing the web of sensitized sheet material is further controlled by a set of contacts operated by a feeler sliding over the margin of the negative carrying film, said feeler opening the contacts when moved over a slotted portion of the film thus deenergizing the energizing circuit of the motor advancing the web of sensitized sheet material.

13. An automatic photoprinting apparatus as claimed in claim 5 wherein a set of contacts is provided operated by a feeler sliding over the margin of the negative carrying film, said feeler closing contacts of an alarm circuit including an alarm signal.

14. An automatic photoprinting apparatus according to claim 1 wherein the means for counting the advance step of the strip of sensitized sheet material comprise a dial and a pointer adapted to be adjusted manually, a dial contact series and a dial contact arm moved over said dial contact series, said dial contact arm being connected with said pointer, an independently movable counter device, including a series of counter contacts, and a counter contact arm moving over the said series of counter contacts, a stepping device for moving said counter contact arm step by step over the last named contacts, connections between corresponding contacts of the dial contact series and counter contact series, completing a circuit, connected with contacts corresponding with respect to their relative position, electromagnetic means operating said stepping device, an energizing circuit for said electromagnetic means, said energizing circuit being controlled by a contact device controlled in its turn by the means for intermittently advancing the web of said sensitized sheet material, the circuit completed by the dial contact arm and counter contact arm moved to corresponding contacts controlling a means for operating said cutter.

15. An automatic photoprinting apparatus for making a number of prints on sensitized sheet material from each of a plurality of negatives, comprising means for intermittently advancing the sensitized sheet material to an exposure station, said means including an electric motor, a drive shaft connected with the motor, a pair of gripping rollers arranged on the two sides of said sensitized sheet material, one roller being driven by said drive shaft and the other roller being a counter roller, movable relatively to the aforesaid roller to bring it into and out of operative gripping position means for bringing said movable counter roller into operative gripping engagement with said sensitized sheet material, means for limiting the gripping engagement of the two rollers to a portion of a full rotation of the driven roller, the sensitized sheet material being only advanced during such gripping engagement of the rollers, means including a counting mechanism with an adjustable presetting mechanism, registering the number of stepwise advances of the continuous web of sensitized material, exposure lamps for exposing said sensitized sheet material in the said exposure station, withdrawable pressure applying means for holding the continuous web of sensitized material during exposure in the exposure station in contact with the film carrying the negatives, withdrawing means for relieving said pressure and withdrawing the pressure applying means, said means for intermittently advancing the continuous web of sensitized sheet material also operating the exposure control means, controlling the exposure lamps and the pressure applying and withdrawing means, and exposure control means operating the said lamps and said last named means between successive web advance producing steps, means for feeding a film carrying the negatives to the exposure station and into a position in contact with the continuous web of sensitized sheet material from a direction different from the direction in which the continuous web is advanced towards the exposure station, web cutting means arranged in front of the exposure station in the direction of advance of the web, controlling means for said web cutting means operated by said counting mechanism when the preset number of advancing steps has been performed, said cutting means being provided with control means controlling the driving means for the intermittent advance of the film carrying the negatives, said cutter thus cutting off from the continuous web of sensitized material a strip containing a preset number of photoprints, and advancing the film carrying the negatives after such cutting off operation.

16. An automatic photoprinting apparatus as claimed in claim 15 wherein the means intermittently pressing said counter roller against the sensitized sheet material include a movable member supporting the said counter roller normally holding said counter roller in an inoperative position and a solenoid for moving the movable member and the counter roller supported by it into its gripping position and holding it in this position.

17. An automatic photoprinting apparatus as claimed in claim 15 wherein the means intermittently pressing said counter roller against the sensitized sheet material and the roller driven by the drive shaft include a movable member supporting said counter roller and normally holding said counter roller in an inoperative position and a solenoid for moving said movable member and the counter roller supported by it into operative position in which the sheet material is gripped, and an energizing circuit for said solenoid, and wherein the means for controlling the period of time during which the counter roller is in gripping position include a plurality of cam disks with cam surfaces of different arcuate length, each operating contacts, controlling the energizing circuit of the solenoid, and means for connecting the said energizing circuit of the solenoid with the contacts operated by one of the cam disks having cam surfaces of an arcuate length determining a preselected period of operation, which corresponds to a predetermined advance of the sensitized sheet material.

18. An automatic photoprinting apparatus as claimed in claim 15 wherein the means intermittently pressing said counter roller against the sensitized sheet material and the roller driven by the drive shaft include a movable member supporting said counter roller and normally holding said counter roller in an inoperative position and a solenoid for moving said movable member and the counter roller supported by it into operative position in which the sheet material is gripped, and an energizing circuit for said solenoid, and wherein the means for controlling the period of time during which the counter roller is in gripping position include a plurality of cam disks with cam surfaces of different arcuate length, each operating contacts, controlling the energizing circuit of the solenoid, means for connecting the said energizing circuit of the solenoid with the contacts operated by one of the cam disks having cam surfaces of an arcuate length determining a preselected period of operation, which corresponds to a predetermined advance of the sensitized sheet material, selector means including a movable contact arm connected with a source of current and moving over a set of fixed contacts each contact being connected with one of the contacts operated by one of the cam disks which are arranged in the energizing circuit of the solenoid.

19. An automatic photoprinting apparatus as claimed in claim 15 wherein the exposure station is provided with means for spacing a negative and sensitized sheet material, and for supporting the negative and sensitized sheet material separately on transparent material, and a lens inserted into the space between negative and sensitized sheet material to produce an enlargement of the negative.

20. An automatic photoprinting apparatus according to claim 15 wherein the drive shaft is provided with a plurality of contact operating means, three contact devices operated by said contact operating means, said contact operating means being set for operating the contact devices during predetermined positions of the gripping rollers, the first contact device being operated when one of said gripping rollers starts to make contact with the counter roller and, upon operation, operating the pressure applying device in the exposure station, the second contact device being operated when the aforesaid gripping roller has left contact with the counter roller, said second contact device controlling the exposure lamps and a third contact device being operated after exposure has been made and before the first named roller again comes into gripping position with the counter roller, said third contact device operating the exposure counters.

21. An automatic photoprinting apparatus according to claim 15 wherein the driving means for the web gripping means include an electric motor provided with an operating circuit containing a manually adjustable resistance adjusting the speed with which the electric motor is driven, the motor speed in its turn determining the speed of advance of the sensitized sheet material and the duration of the exposure.

22. An automatic photoprinting apparatus for making prints successively from a plurality of negatives on a continuous web of sensitized sheet material comprising a continuous film carrying the negatives from which the photoprints are made, an exposure station to which said film and the said continuous web of sensitized sheet material is fed, a transparent supporting plate for the said film holding said film and said continuous web of sensitized sheet material in contact with each other and supporting the film and the web in said station along an area corresponding to that of one negative of the film, a platen pressing said sensitized sheet material against the film in said exposure station, springs for exercising a constant pressure on said platen forcing it against the sensitized web and forcing the latter against the film and against the transparent support, a solenoid for withdrawing said platen, guide members at an angle to the transparent surface for guiding the film to said support at an angle with respect to the continuous web of sensitized material, a cutting means close to and arranged in front of said exposure station in the direction of movement of the sensitized sheet material, a solenoid for operating said cutting means, said cutting means thus cutting the web of sensitized sheet material on its way to the exposure station, directly in front of the same, automatic means for independently advancing the film and advancing said continuous web of sensitized sheet material to the exposure station, the film advance means being controlled by the cutter and including an electric motor and a contact closing device operated by the said electric motor, an energizing and control circuit for the electric motor closed upon operation of the cutting device, the electric motor thus advancing said film after the cutting of the web, while the independent web advancing means advance the web stepwise over a length corresponding to one exposed area at a time and through a predetermined number of steps corresponding to the number of copies to be made from one negative, said web advancing means being provided with contacts closed upon each stepwise advance, a counter controlling the operation of the cutting device and operated by the contacts of the web advancing means, the contacts of the web advancing means also operating the solenoid of the platen to withdraw the same from contact with the web, the web cutting device being thus operated solely after the advance of the continuous web over a length of the web corresponding to the number of exposed areas made from a single negative on the film, and the film advance being automatically produced after the desired number of exposures from one negative have been made, bringing the next negative into position for exposure.

References Cited in the file of this patent

UNITED STATES PATENTS

| | | |
|---|---|---|
| 2,292,825 | Dilks | Aug. 11, 1942 |
| 2,307,646 | Sonne | Jan. 5, 1943 |
| 2,539,764 | Wisegarver | Jan. 30, 1951 |
| 2,592,735 | Pirmov | Apr. 15, 1952 |
| 2,616,331 | Pavelle | Nov. 4, 1952 |
| 2,657,613 | Maker et al. | Nov. 3, 1953 |
| 2,699,703 | Mourfield | Jan. 18, 1955 |
| 2,703,280 | Butterfield et al. | Mar. 1, 1955 |
| 2,764,059 | Bottoms | Sept. 25, 1956 |